(12) United States Patent
Coimbra De Andrade et al.

(10) Patent No.: US 12,136,278 B2
(45) Date of Patent: *Nov. 5, 2024

(54) SYSTEMS AND METHODS FOR IDENTIFYING DISTRACTED DRIVER BEHAVIOR FROM VIDEO

(71) Applicant: Verizon Connect Development Limited, Dublin (IE)

(72) Inventors: Douglas Coimbra De Andrade, Florence (IT); Andrea Benericetti, Prato (IT); Aurel Pjetri, Florence (IT); Leonardo Taccari, Florence (IT); Francesco Sambo, Florence (IT); Alex Quintero Garcia, Gorey (IE); Luca Bravi, Scandicci (IT)

(73) Assignee: Verizon Connect Development Limted, Dublin (IE)

( * ) Notice: Subject to any disclaimer, the term of this patent is extended or adjusted under 35 U.S.C. 154(b) by 1 day.

This patent is subject to a terminal disclaimer.

(21) Appl. No.: 18/302,979

(22) Filed: Apr. 19, 2023

(65) Prior Publication Data

US 2023/0252800 A1    Aug. 10, 2023

Related U.S. Application Data

(63) Continuation of application No. 16/947,780, filed on Aug. 17, 2020, now Pat. No. 11,651,599.

(51) Int. Cl.
*G06V 20/59* (2022.01)
*B60W 40/09* (2012.01)
(Continued)

(52) U.S. Cl.
CPC ............. *G06V 20/59* (2022.01); *B60W 40/09* (2013.01); *B60W 50/14* (2013.01); *G06N 20/00* (2019.01);
(Continued)

(58) Field of Classification Search
CPC ...... G06V 20/59; G06V 40/172; G06V 20/40; G06T 7/10; G06T 2207/20081;
(Continued)

(56) References Cited

U.S. PATENT DOCUMENTS 9,714,037 B2 *   7/2017   DeRuyck ............. G06V 20/597
10,065,652 B2 *  9/2018   Shenoy ................. G07C 5/008
(Continued)

OTHER PUBLICATIONS

Carreira, et al., "Quo Vadis, Action Recognition? A New Model and the Kinetics Dataset", Feb. 12, 2018, arXiv:1705.07750v3, Website: https://arxiv.org/pdf/1705.07750.pdf, 10 Pages.

(Continued)

*Primary Examiner* — Gregory M Desire

(57) ABSTRACT

A device may process the video data, with a first machine learning model, to identify a driver of a vehicle and may process the video data associated with the driver, with a second machine learning model, to detect behavior data identifying a behavior of the driver. The device may process the behavior data, with a third machine learning model, to determine distraction data identifying whether the behavior is classified as a distracted behavior. The device may process the behavior data, with a fourth machine learning model, to determine policy compliance data identifying whether the (Continued)

behavior satisfies one or more policies. The device may calculate a distraction score based on the distraction data and the video data, and may calculate a policy compliance score based on the policy compliance data and vehicle data. The device may perform one or more actions based on the distraction score and the policy compliance score.

20 Claims, 12 Drawing Sheets

(51) Int. Cl.
  *B60W 50/14* (2020.01)
  *G06N 20/00* (2019.01)
  *G06T 7/10* (2017.01)
  *G06V 20/40* (2022.01)
  *G06V 40/16* (2022.01)

(52) U.S. Cl.
  CPC ............... *G06T 7/10* (2017.01); *G06V 20/40* (2022.01); *G06V 40/172* (2022.01); *B60W 2540/229* (2020.02); *G06T 2207/20081* (2013.01); *G06T 2207/20132* (2013.01); *G06T 2207/30201* (2013.01)

(58) Field of Classification Search
  CPC ........... G06T 2207/20132; G06T 2207/30201; G06N 20/00; B60W 40/09; B60W 50/14; B60W 2540/229
  See application file for complete search history.

(56) References Cited

U.S. PATENT DOCUMENTS

| | | |
|---|---|---|
| 10,417,506 B2 | 9/2019 | Satzoda et al. |
| 10,467,488 B2 * | 11/2019 | Sicconi .................. G06V 40/20 |
| 10,528,815 B2 | 1/2020 | Maheriya et al. |
| 10,769,461 B2 * | 9/2020 | Madkor ................... G08G 1/04 |
| 10,836,309 B1 * | 11/2020 | Trundle ............... G08G 1/0116 |
| 10,853,675 B2 | 12/2020 | Wang et al. |
| 11,120,707 B2 | 9/2021 | Hans et al. |
| 11,249,544 B2 * | 2/2022 | Sicconi ................ G08B 3/1016 |
| 11,392,131 B2 | 7/2022 | Satzoda et al. |
| 11,580,756 B2 * | 2/2023 | Gleeson-May ...... G06V 40/171 |
| 11,590,982 B1 * | 2/2023 | Daniels ................. B60W 40/09 |

OTHER PUBLICATIONS

Redmon, et al., "You Only Look Once: Unified, Real-Time Object Detection", https://pireddie.com/media/files/papers/yolo.pdf, 2016, 10 pages.

* cited by examiner

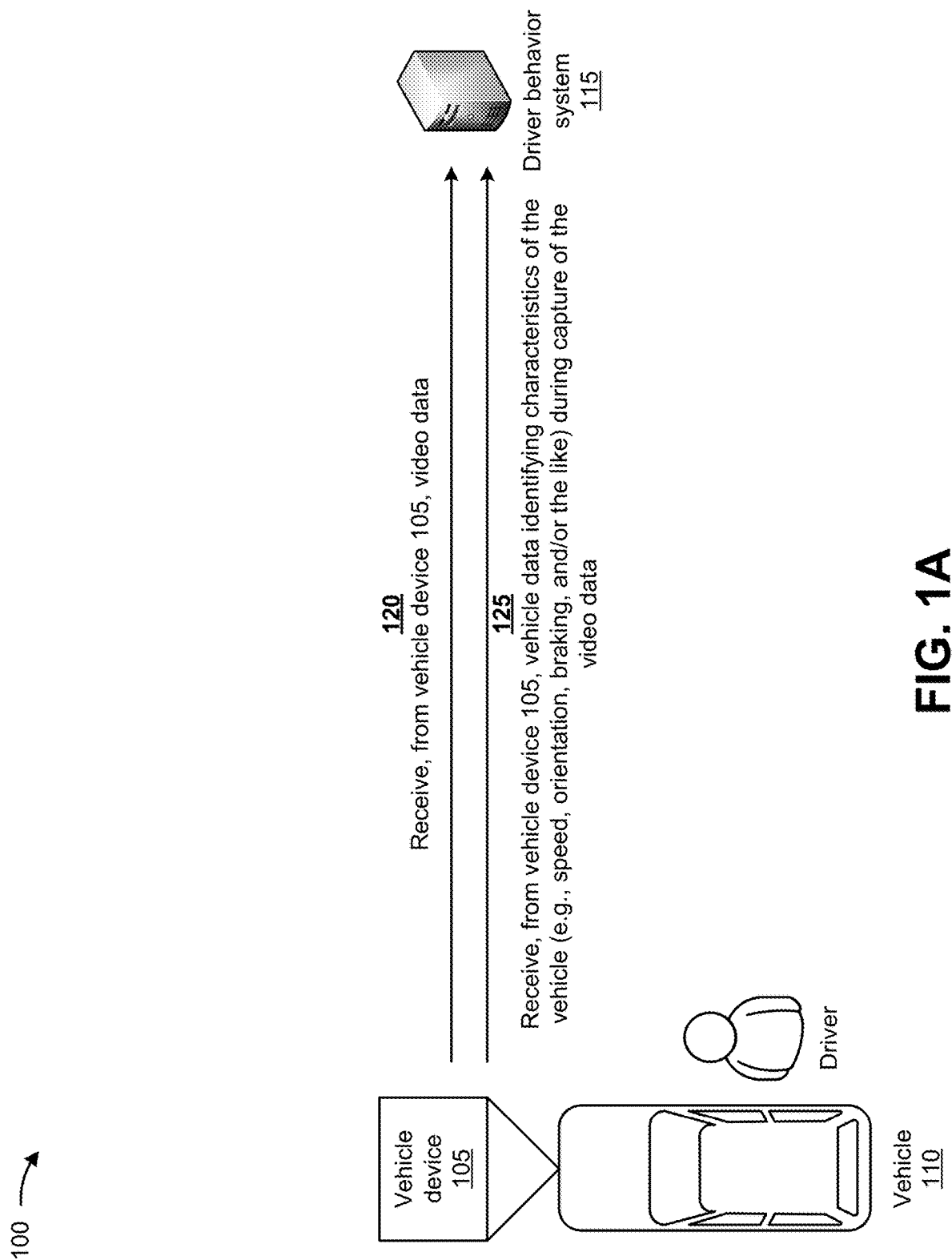

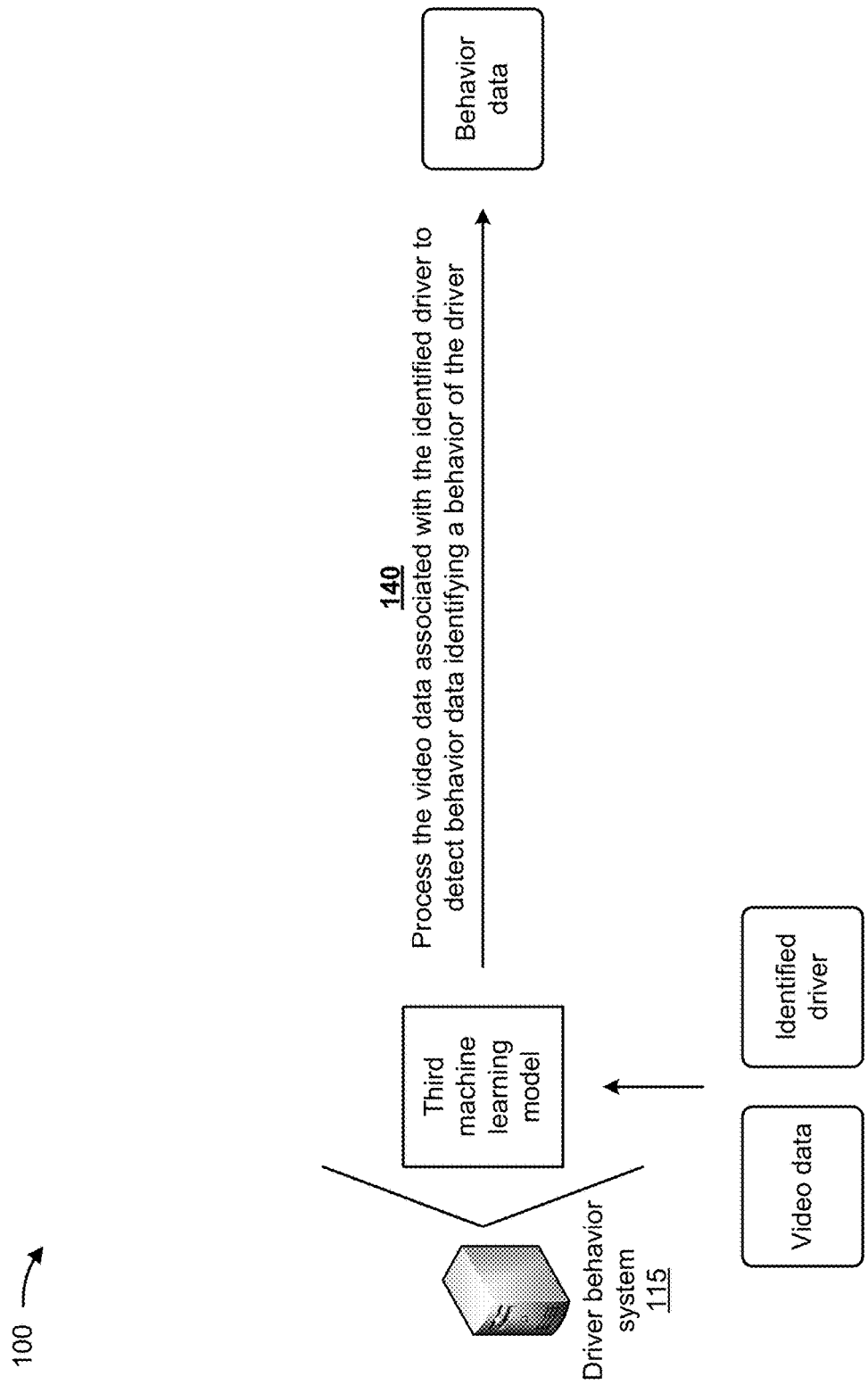

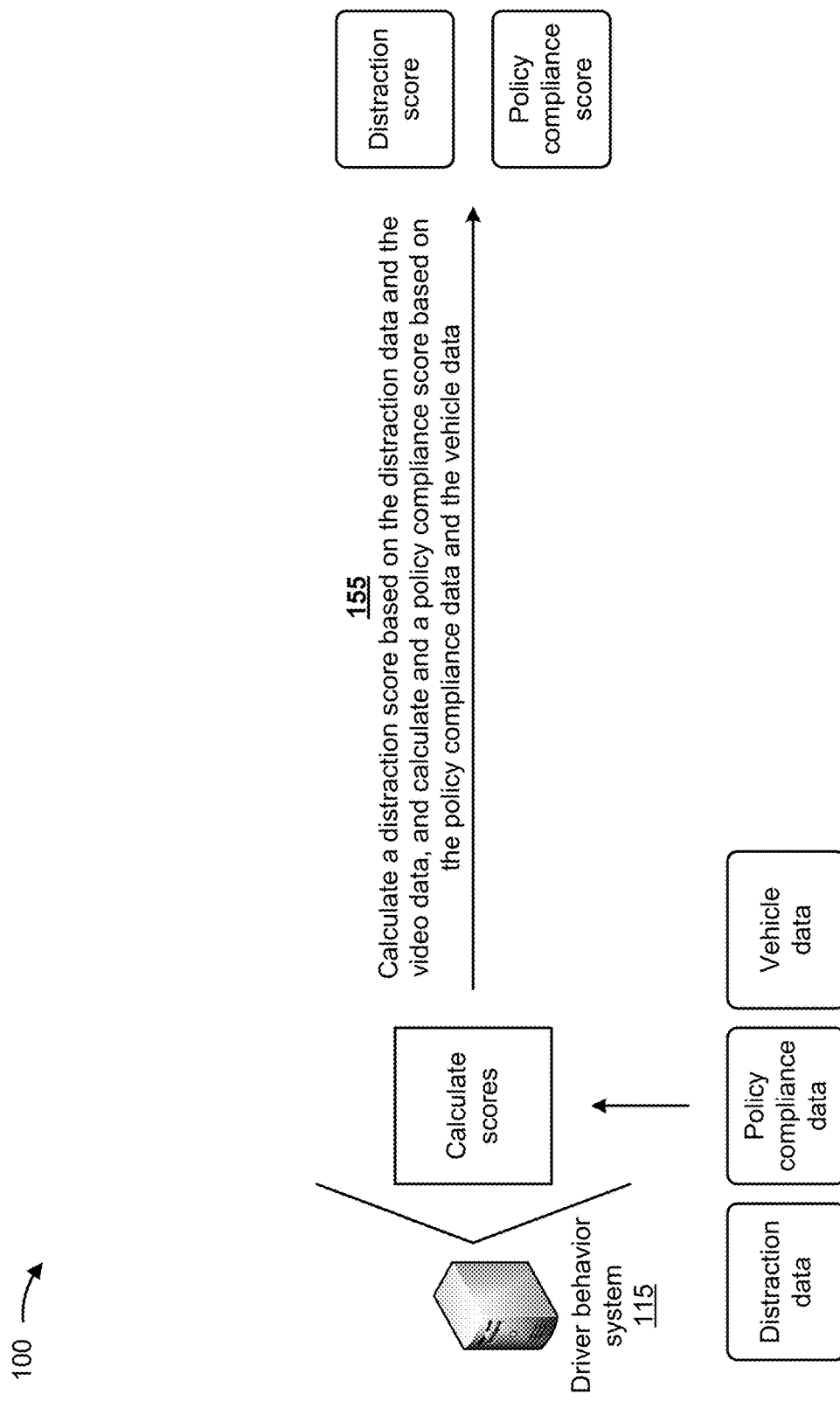

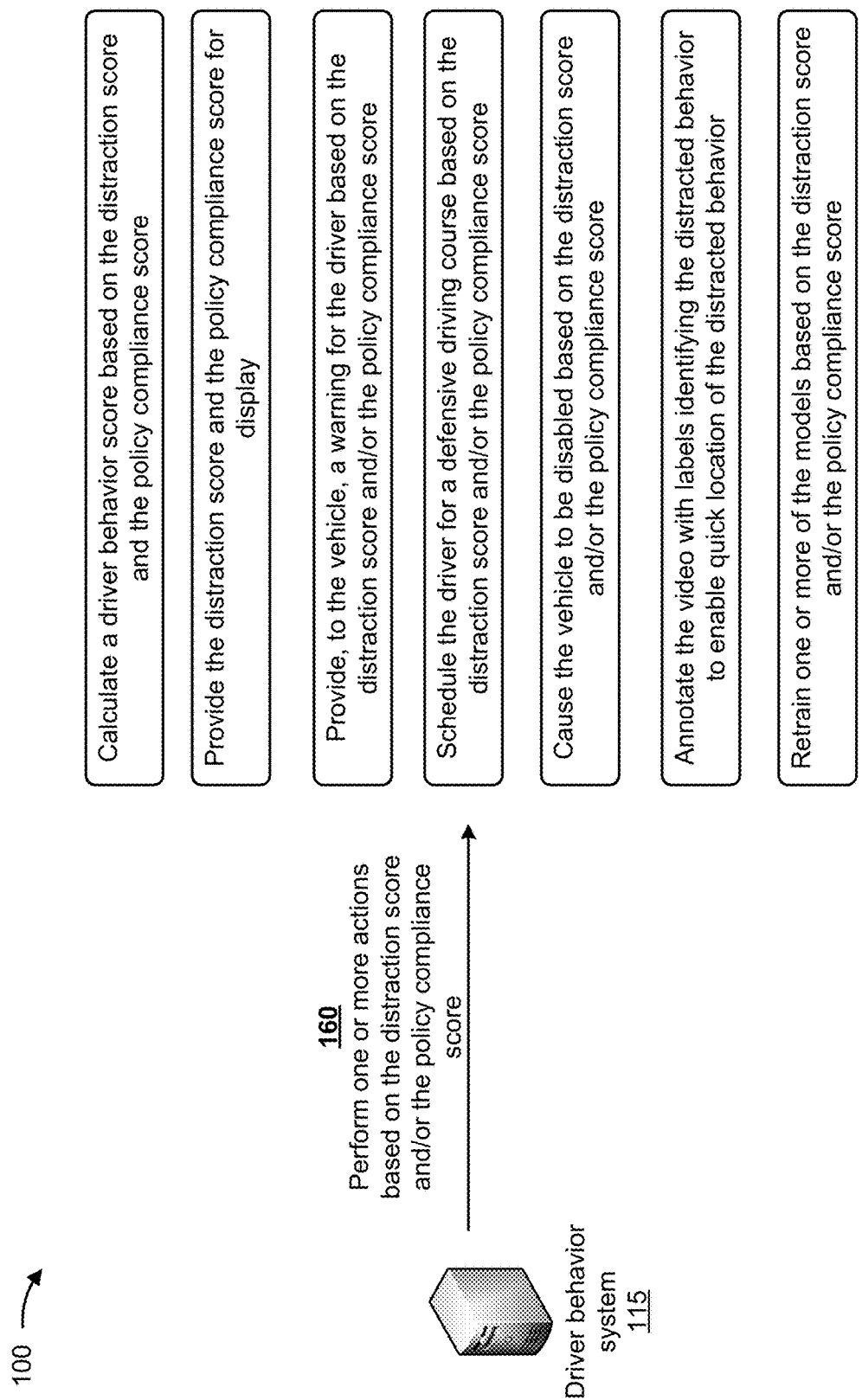

SYSTEMS AND METHODS FOR IDENTIFYING DISTRACTED DRIVER BEHAVIOR FROM VIDEO

RELATED APPLICATION

This application is a continuation of U.S. patent application Ser. No. 16/947,780, titled "SYSTEMS AND METHODS FOR IDENTIFYING DISTRACTED DRIVER BEHAVIOR FROM VIDEO," filed Aug. 17, 2020, which is incorporated herein by reference in its entirety.

BACKGROUND

A dashboard camera can be mounted to a vehicle to capture video data related to the vehicle, a road the vehicle is traveling on, a path of the vehicle on the road, one or more objects on the road and/or in the path of the vehicle, the driver driving the vehicle, and/or the like.

BRIEF DESCRIPTION OF THE DRAWINGS

FIGS. 1A-1H are diagrams of an example implementation described herein.

DETAILED DESCRIPTION OF PREFERRED EMBODIMENTS

Figure 1B:
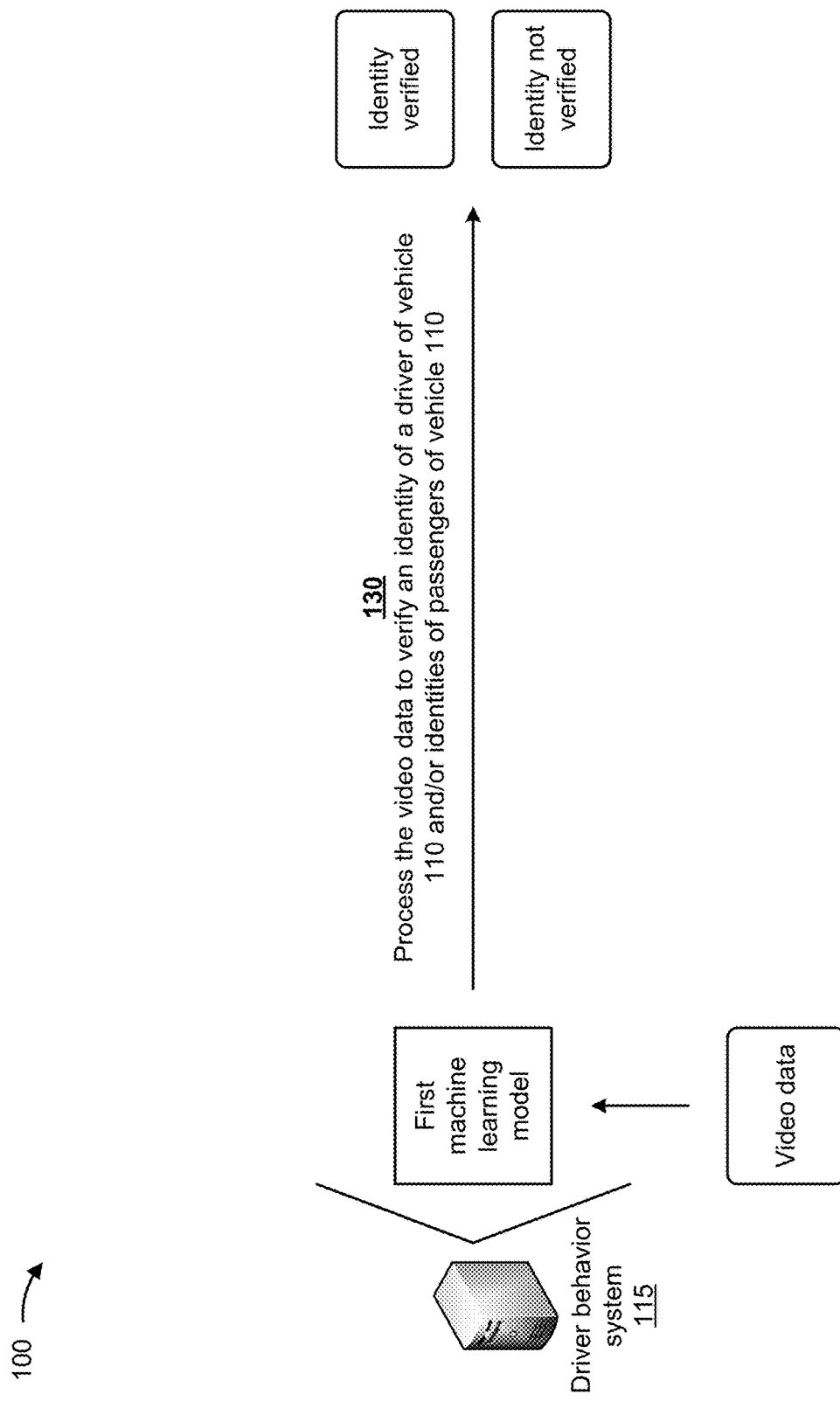

The following detailed description of example implementations refers to the accompanying drawings. The same reference numbers in different drawings may identify the same or similar elements.

A dashboard camera system can obtain video data regarding a driver's operation of a vehicle, which may provide valuable context to understanding a driver's driving behavior. In some cases, a dashboard camera system may comprise a forward facing camera (FFC) or a driver facing camera (DFC). While the FFC records traffic conditions experienced by the vehicle, the DFC records physical movements and/or utterances of the driver and/or passengers in the vehicle. In the context of fleet management, a fleet manager may utilize dashboard camera systems for each vehicle in a fleet of vehicles. To promote safer driving of the vehicles in the fleet, the fleet manager may review the video data associated with the fleet's dashboard camera systems to try to identify unsafe driver behavior, such as distracted behavior, and/or driver compliance with company policies. This can be a resource intensive, time-consuming procedure that is susceptible to human error.

Some implementations described herein provide a driver behavior system that analyzes video data from a DFC. The driver behavior system identifies a driver of the vehicle, identifies a behavior (e.g., a driving behavior) of the driver, determines distraction data identifying whether the behavior is classified as a distracted behavior, and/or determines compliance data identifying whether the behavior satisfies one or more policies (e.g., company driving policies, such as the driver wearing a uniform). In some aspects, these actions may be performed with the aid of one or more machine learning models. The driver behavior system calculates a distraction score (e.g., that indicates a severity of the driver's distracted behavior) based on the distraction data and/or a policy compliance score (e.g., that indicates a level of the driver's compliance with the one or more policies) based on the policy compliance data. Accordingly, the driver behavior system performs one or more actions based on the distraction score and/or policy compliance score, such as calculate a driver behavior score that can be used by the driver and/or a fleet manager to improve the driver's driving behavior and/or compliance with the one or more policies.

In this way, implementations described herein can automatically alert fleet managers and/or drivers of distracted and/or unsafe driving behavior. Thus, the vehicle platform conserves computing resources (e.g., processing resources, memory resources, and/or the like), communication resources, networking resources, and/or the like that would otherwise be used by a fleet manager to review video data to identify unsafe driving behavior. This also provides drivers and/or fleet managers with information that can be used to change the driving behavior of the drivers, which can prevent or reduce distracted and/or unsafe driving behavior in the future. This can result in the increased safety of the drivers, the vehicles that the drivers operate, and other people and property. This can also result in less wear-and-tear on the vehicles or vehicle components, which can reduce costs associated with maintaining the vehicles.

FIGS. 1A-1H are diagrams of an example 100 associated with utilizing machine learning models to identify driver behavior from video. As shown in FIGS. 1A-1H, example 100 includes a vehicle device 105 associated with a vehicle 110 and a driver behavior system 115. In some implementations, the vehicle device 105 may include devices (e.g., on-board diagnostic (OBD) devices, electronic control units (ECUs), and/or the like) that obtain vehicle information (e.g., engine on condition, engine off condition, data indicating acceleration, speed, movement, and/or the like of the vehicle 110 and control other vehicle devices. In some implementations, the vehicle device 105 may include a camera, such as a DFC, that captures video data (e.g., of a driver of the vehicle 110). In some implementations, the vehicle device 105 may include a vehicle tracking unit (VTU) that periodically transmits (e.g., via a cellular network) messages, each typically including information that identifies a current location of the vehicle 110. The VTU can also be capable of transmitting other information associated with the VTU and/or the vehicle 110, such as the vehicle information, the video data, and/or the like. Driver behavior system 115 may include a system that utilizes one or more models to identify driver behavior from the current location of the vehicle 110, the vehicle information, the video data, and/or the like.

As shown in FIG. 1A, and by reference number 120, the driver behavior system 115 may receive video data from the vehicle device 105. For example, the vehicle device 105 (e.g., using the VTU) may send the video data to the driver behavior system 115 (e.g. via the cellular network). The video data may be captured by the camera of the vehicle device 105. In some implementations, the video data may comprise a plurality of video frames, where one video frame comprises video data information for a specific moment in time. In some implementations, the video data has a frame rate (e.g., a quantity of video frames per second).

In some implementations, the vehicle device 105 may send the video data to the driver behavior system 115 on a schedule (e.g., every 20 seconds, every minute, every 5 minutes, and/or the like). In some implementations, the vehicle device 105 may send the video data to the driver behavior system 115 based on a trigger event. For example, the vehicle device 105 may determine (e.g., based on the vehicle data, such as the data indicating the acceleration of the vehicle 110) that the vehicle 110 has been subjected to a harsh driving event, such as a harsh braking event, a quick start event, a cornering event, a crash event, an off-road event, and/or the like. The vehicle device 105 may therefore send the video data to the driver behavior system 115 based on detecting the harsh driving event. As another example, the vehicle device 105 may detect a particular behavior, such as a distracted behavior, of the driver of the vehicle 110 (e.g., by analyzing the video data obtained by the camera of the vehicle device 105 in a similar manner as that described herein) and may therefore send the video data to the driver behavior system 115. In another example, the driver behavior system 115 may request the video data from the vehicle device 105, and the vehicle device 105 may send the video data to the driver behavior system 115 as a response.

As further shown in FIG. 1A, and by reference number 125, the driver behavior system 115 may receive vehicle data from the vehicle device 105. For example, the vehicle device 105 (e.g., using the VTU) may send the vehicle data to the driver behavior system 115 (e.g. via the cellular network). The vehicle data may include identifying characteristics of the vehicle 110 (e.g., speed, acceleration, location, orientation, braking, and/or the like) during capture of the video data.

As shown in FIG. 1B, and by reference number 130, the driver behavior system 115 may process the video data to verify an identity of a driver of the vehicle 110 and/or identities of passengers of the vehicle 110. In some implementations, the driver behavior system 115 may process the video data using a first machine learning model to verify the identity of the driver of the vehicle 110 and/or the identities of passengers of the vehicle 110. For example, the driver behavior system 115 may use a deep convolutional neural network to extract facial information (e.g., one or more face positions and/or features) of one or more potential faces in one or more video frames of the video data, compare (e.g., based on vector similarity) the facial information of the one or more potential faces to facial information of known faces (e.g., that are authorized to drive and/or ride in the vehicle 110), and thereby verify (or not verify) the identity of the driver of the vehicle 110 and/or the identities of the passengers of the vehicle 110.

The first machine learning model may have been trained based on historical data associated with historical video data (e.g., obtained from multiple vehicle devices 105 associated with multiple vehicles 110), historical verifications of identities of drivers and/or passengers of the vehicles 110, and/or the like. Using the historical data as inputs to the first machine learning model, the first machine learning model may be trained to identify one or more relationships for determining an identity of a driver of a vehicle 110 and/or identities of passengers of a vehicle 110. The first machine learning model may be trained and/or used in a similar manner to that described below with respect to FIG. 2.

Figure 1C:
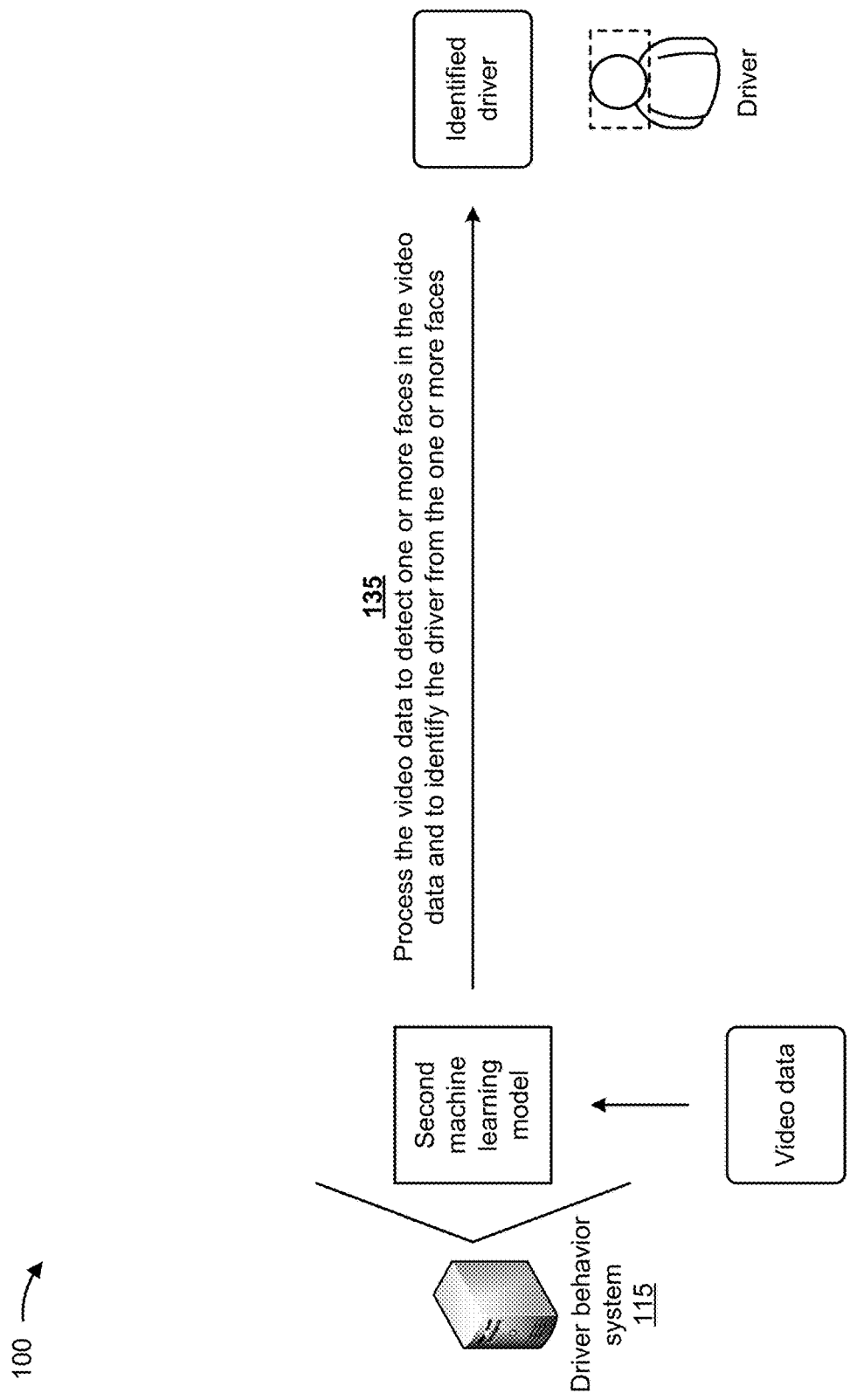

As shown in FIG. 1C, and by reference number 135, the driver behavior system 115 may process the video data to detect one or more faces in the video data and to identify the driver of the vehicle 110 from the one or more faces. In some implementations, the driver behavior system 115 may process the video data using a second machine learning model to detect the one or more faces in the video data and to identify the driver from the one or more faces. For example, the driver behavior system 115 may use one or more neural network models, support vector machine (SVM) models, random forest classification models, and/or the like to perform identity verification on one or more video frames of the video data to verify the identity of the driver from one or more faces depicted in the one or more video frames.

The second machine learning model may have been trained based on historical data associated with historical video data (e.g., obtained from multiple vehicle devices 105 associated with multiple vehicles 110), historical identifications of one or more faces associated with the historical video data, historical identifications of drivers of the one or more faces, and/or the like. Using the historical data as inputs to the second machine learning model, the second machine learning model may be trained to identify one or more relationships (e.g., placement of a face of a driver in a video frame and/or the like) for identifying a driver of a vehicle 110 among one or more faces in video data. The second machine learning model may be trained and/or used in a similar manner to that described below with respect to FIG. 2.

In some implementations, processing the video data (e.g., using the second machine learning model) to detect the one or more faces in the video data and to identify the driver from the one or more faces includes generating a bounding box for a video frame of the video data, assigning weights to faces, of the one or more faces, provided in the bounding box, calculating scores for the faces based on assigning weights to the faces; and identifying one of the faces as the driver based on the scores. For example, the driver behavior system 115 may generate a bounding box associated with a left or right portion of a video frame where the driver is expected to be, assign a weight to a face provided in the bounding box based on an area (e.g., in pixels) associated with the face, multiply the weight by a horizontal offset (e.g., a difference between a central axis of the video frame and a farthest point of the area associated with the face that is the farthest away from the central axis) to calculate a score for the face, and identify the face as the driver based on the score.

In some implementations, the driver behavior system 115 may determine that the one or more faces included in the video data do not correspond to the driver of the vehicle 110 (e.g., because an unauthorized person is driving the vehicle 110) and may generate and/or provide a notification (e.g., to a client device associated with the driver behavior system 115) indicating that the vehicle 110 is not being operated by the driver. In some implementations, the driver behavior system 115 may determine that no faces are included in the video data and may generate and/or provide a notification (e.g., to the client device) indicating that the camera of the vehicle device 105 is not working properly (e.g., a field of view of the camera of the vehicle device 105 is not pointed at a location in the vehicle 110 where the driver is expected to be).

As shown in FIG. 1D, and by reference number 140, the driver behavior system 115 may process the video data associated with the identified driver to detect behavior data identifying a behavior of the driver. In some implementations, the driver behavior system 115 may process the video data using a third machine learning model to detect the behavior data. For example, the driver behavior system 115 may use one or more neural network models, SVM models, random forest classification models, and/or the like to process the video data to detect the behavior data. The behavior data may indicate, for example, that the driver is looking down (e.g., not looking at the road on which the vehicle 110 is traveling), that the driver is using a user device (e.g., to text while driving), that the driver is not wearing a seat belt, that the driver is not wearing an authorized uniform, and/or the like.

The third machine learning model may have been trained based on historical data associated with historical video data (e.g., obtained from multiple vehicle devices 105 associated with multiple vehicles 110), historical identification of behavior of drivers of the multiple vehicles 110, and/or the like. Using the historical data as inputs to the third machine learning model, the third machine learning model may be trained to identify a behavior of a driver of a vehicle 110 in video data. The third machine learning model may be trained and/or used in a similar manner to that described below with respect to FIG. 2.

In some implementations, processing the video data (e.g., using the third machine learning model) to detect the behavior data includes determining a head pitch of the driver based on a video frame of the video data and determining whether the driver is looking forward or looking down based on the pitch. For example, the driver behavior system 115 may determine that the driver is looking forward when the head pitch is approximately zero degrees and that the driver is looking down when the head pitch satisfies (e.g., is greater than or equal to) a threshold, such as twenty degrees. Additionally, or alternatively, processing the video data (e.g., using the third machine learning model) to detect the behavior data includes determining a head pitch of the driver based on multiple video frames of the video data, applying a filter (e.g., a median filter) to the multiple frames of the video data to determine time intervals where the head pitch behavior is uniform (e.g. looking down or looking forward); and determining whether the driver is looking forward or looking down in the time intervals where the head pitch behavior is uniform. For example, the driver behavior system 115 may determine that the driver is looking forward when the head pitch is continuous and in a range from approximately zero degrees to approximately ten degrees or may determine that the driver is looking down when the head pitch is continuous and greater than approximately twenty degrees. For example, the driver behavior system 115 may determine that the driver is looking forward when the head pitch behavior is determined to be uniform in a time interval and the head pitch is within a range from approximately zero degrees to approximately ten degrees or may determine that the driver is looking down when the head pitch behavior is determined to be uniform in a time interval and the head pitch is greater than approximately ten degrees.

Figure 1E:
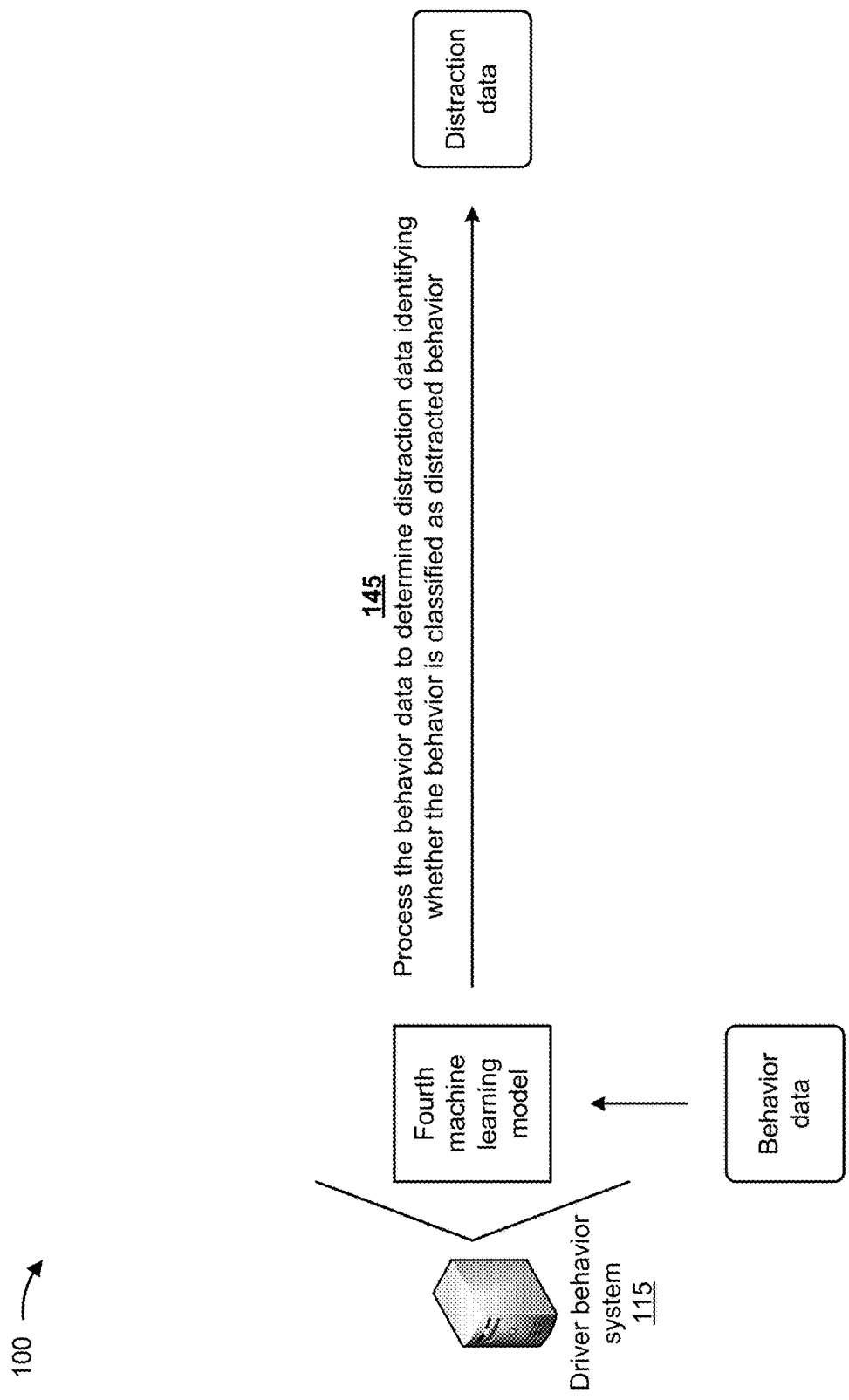

As shown in FIG. 1E, and by reference number 145, the driver behavior system 115 may process the behavior data to determine distraction data identifying whether the behavior of the driver is classified as a distracted behavior. For example, the driver behavior system 115 may determine that the behavior is classified as a distracted behavior by determining that the driver is looking down, that a user device is present in the video data, that the driver is utilizing a user device, that the driver is yawning or blinking, that the driver is rubbernecking, and/or the like. In some implementations, the driver behavior system 115 may process the behavior data using a fourth machine learning model to determine the distraction data. For example, the driver behavior system 115 may use one or more neural network models, SVM models, random forest classification models, and/or the like to process the behavior data to determine the distraction data.

The fourth machine learning model may have been trained based on historical data associated with historical behavior data (e.g., associated with behaviors of multiple drivers of multiple vehicles 110), historical determinations of whether the behaviors are classified as distracted behaviors, and/or the like. Using the historical data as inputs to the fourth machine learning model, the fourth machine learning model may be trained to identify one or more relationships (e.g., between the historical behavior data, the historical determinations of whether the behaviors are classified as distracted behaviors, and/or the like) for identifying a behavior as a distracted behavior. The fourth machine learning model may be trained and/or used in a similar manner to that described below with respect to FIG. 2.

In some implementations, processing the behavior data (e.g., using the fourth machine learning model) to determine the distraction data includes detecting a plurality of facial points of the driver from the behavior data and determining a yaw, roll, and/or pitch of a head of the driver based on the plurality of facial points. For example, the driver behavior system 115 may use a deep neural network (e.g., trained on images of faces annotated with facial orientation) to predict a yaw, roll, and/or pitch of the driver based on the plurality of facial points. In some implementations, the driver behavior system 115 may identify a forward looking position of the driver's face (e.g., a median yaw, roll, and/or pitch of the head of the driver) based on median values associated with the plurality of facial points and may determine a deviation from the forward looking position based on the predicted yaw, roll, and/or pitch of the driver. For example, the driver behavior system 115 may determine that the driver is looking down when the deviation satisfies (e.g., is greater than or equal to) a first threshold and may therefore determine that behavior of the driver is classified as a distracted behavior. As another example, the driver behavior system 115 may determine that the driver is rubbernecking when the deviation satisfies (e.g., is greater than or equal to) a second threshold and may therefore determine that behavior of the driver is classified as a distracted behavior.

In some implementations, processing the behavior data (e.g., using the fourth machine learning model) to determine the distraction data includes detecting a presence of an object from the behavior data. For example, the driver behavior system 115 may utilize a bounding box detector (e.g., based on using a single shot detector (SSD) model, a you only look once (YOLO) model, a recurrent convolutional neural network (RCNN) model, and/or the like) that detects an object (e.g., that resembles a user device) from the behavior data. The driver behavior system 115 may calculate a confidence level that the object is a user device (e.g., using a convolutional neural network (CNN) model, such as a residual neural network (ResNet) model, an Inception model, an Xception model, and/or the like) and may determine that the behavior is classified as a distracted behavior by determining the presence of the user device when the confidence level satisfies (e.g., is greater than or equal to) a threshold level. Additionally, or alternatively, the driver behavior system 115 may utilize an activation map (e.g., that indicates discriminative portions of the behavior data) to detect utilization of a user device from the behavior data, calculate a confidence level that the user device is being utilized by the driver, and determining that the behavior is classified as a distracted behavior by determining that the driver is utilizing the user device when the confidence level satisfies (e.g., is greater than or equal to) a threshold level.

In some implementations, processing the behavior data (e.g., using the fourth machine learning model) to determine the distraction data includes cropping a plurality of images of a face of the driver based on the behavior data, determining (e.g., using a CNN) whether eyes of the driver are opened or closed a first threshold quantity of times based on the cropped plurality of images, determining whether a mouth of the driver is opened a second threshold quantity of times based on the cropped plurality of images, and determining that the behavior is classified as a distracted behavior by determining that the driver is blinking when the first quantity of times is satisfied and/or by determining that the driver is yawning when the second quantity of times is satisfied.

In some implementations, processing the behavior data (e.g., using the fourth machine learning model) to determine the distraction data includes determining a yaw, roll, and/or pitch of a head of the driver (e.g., as described above) and detecting a presence of an object (e.g., as described above). The driver behavior system 115 may determine, based on the yaw, roll, and/or pitch of the head of the driver and the presence of the object (e.g., a user device) whether the driver is looking at the object for a threshold period of time and determining that the behavior is classified as a distracted behavior by determining that the driver is looking at the object when the threshold period of time is satisfied.

Figure 1F:
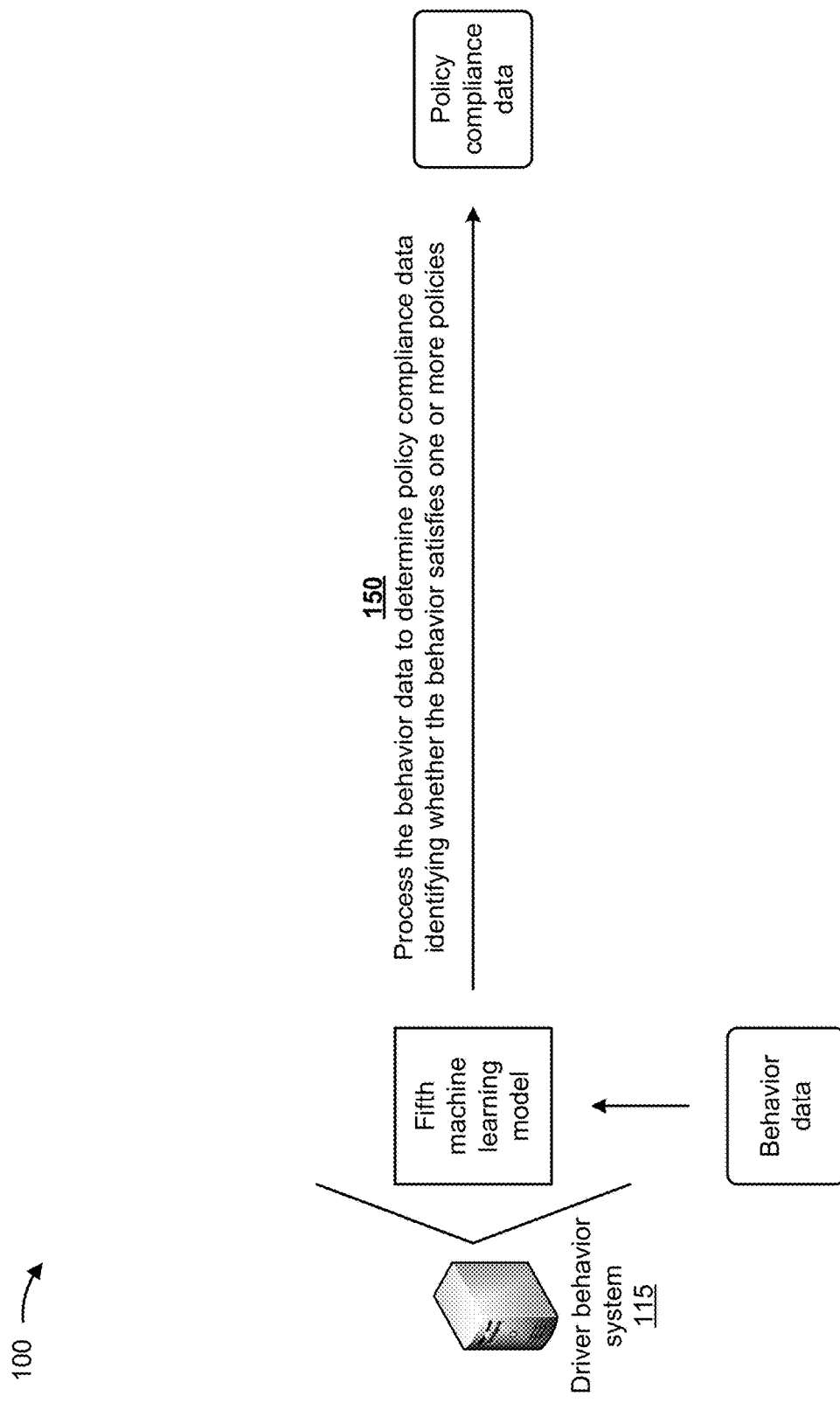

As shown in FIG. 1F, and by reference number 150, the driver behavior system 115 may process the behavior data to determine policy compliance data identifying whether the behavior satisfies one or more policies. The one or more policies may include a policy associated with: no smoking in the vehicle, wearing a seat belt in the vehicle, wearing a uniform in the vehicle, no drinking beverages in the vehicle, no eating food in the vehicle; and/or the like. In some implementations, the driver behavior system 115 may process the behavior data using a fifth machine learning model to determine the compliance data. For example, the driver behavior system 115 may use one or more neural network models, SVM models, random forest classification models, and/or the like to perform behavior detection (e.g., detecting whether the driver is smoking, wearing a seat belt, wearing a uniform, drinking a beverage, eating food, and/or the like) on the behavior data (e.g., in a similar manner as that described herein in relation to FIG. 1E) to determine whether a behavior satisfies one or more policies.

The fifth machine learning model may have been trained based on historical data associated with historical behavior data (e.g., associated with behaviors of multiple drivers of multiple vehicles 110), historical determinations of whether the behaviors satisfy one or more policies, and/or the like. Using the historical data as inputs to the fifth machine learning model, the fifth machine learning model may be trained to identify one or more relationships for identifying a behavior as complying with a policy. The fifth machine learning model may be trained and/or used in a similar manner to that described below with respect to FIG. 2.

As shown in FIG. 1G, and by reference number 155, the driver behavior system 115 may calculate a distraction score (e.g., that indicates a severity of the distracted behavior(s) of the driver) based on the distraction data and/or the vehicle data and/or calculate a policy compliance score (e.g., that indicates how compliant a driver is with one or more policies) based on the policy compliance data and the vehicle data.

In some implementations, the driver behavior system 115 may aggregate the distraction data and the vehicle data to calculate the distraction score. The driver behavior system 115 may identify one or more distracted behaviors (e.g., driver looking down, user device present, user device being used, and/or the like) based on the distraction data, and determine a distraction sub-score for each distracted behavior (e.g., that indicates severity of each distracted behavior) based on the vehicle data (e.g., that indicates a speed of the vehicle 110, an acceleration of the vehicle 110, and/or the like). For example, the driver behavior system 115 may determine that a first distracted behavior (e.g., looking down) has a first distraction sub-score that is a function of the speed of the vehicle 110, a second distracted behavior (e.g., using a user device) has a second distraction sub-score that is a function of the speed of the vehicle 110 and the length of time the user device is used, and/or the like. Accordingly, the driver behavior system 115 may combine (e.g., sum; average; use a set of custom rules and/or non-linear functions; use a machine learning model, such as one or more neural network models, SVM models, random forest classification models, and/or the like) the distraction sub-scores together to determine the distraction score.

In some implementations, the driver behavior system 115 may aggregate the policy compliance data and the vehicle data to calculate the policy compliance score. The driver behavior system 115 may identify one or more behaviors (e.g., whether the driver is wearing a uniform, whether the driver is eating, whether the driver is smoking, and/or the like) based on the policy compliance data, and determine a policy compliance sub-score for each behavior (e.g., that indicates how long and/or frequently the driver is complying with a policy). For example, the driver behavior system 115 may determine that a first behavior (e.g., wearing a uniform) has a first policy compliance sub-score, a second behavior (e.g., not smoking) has a second policy compliance sub-score, and/or the like. Accordingly, the driver behavior system 115 may combine (e.g., add, average, and/or the like) the policy compliance sub-scores together to determine the policy compliance score.

As shown in FIG. 1H, and by reference number 160, the driver behavior system 115 may perform one or more actions based on the distraction score and/or the policy compliance score. In some implementations, the one or more actions may include calculating a driver behavior score based on the distraction score and/or the policy compliance score. For example, the driver behavior system 115 may apply weights to the distraction score and the policy compliance score to generate a weighted distraction score and a weighted policy compliance score, and combine the weighted distraction score and the weighted policy compliance score to generate a driving behavior score for the driver of the vehicle 110.

In some implementations, the one or more actions may include providing the distraction score, the policy compliance score, and/or the driver behavior score for display. For example, the driver behavior system 115 may provide the distraction score, the policy compliance score, and/or the driver behavior score for display on a client device or on another device associated with vehicle 110 for display to the driver of vehicle 110, to an employer of the driver, to an owner of vehicle 110, and/or the like. As another example, the driver behavior system 115 may provide a warning (e.g., based on the distraction score, the policy compliance score, and/or the driver behavior score) to the vehicle 110 (e.g., to be displayed on a display of the vehicle 110) for display to the driver. In this way, the driver behavior system 115 may enable the driver of vehicle 110, the employer of the driver, the owner of the vehicle 110, and/or the like, to be aware of distracted driving behavior and/or behavior that doesn't comply with policy. This may enable the driver to effectively adjust and/or improve driving techniques and/or behavior, which may improve road safety, conserve fuel, conserve resources that would otherwise be wasted policing poor driving behavior and/or policy noncompliance, handling vehicle accidents, and/or the like.

In some implementations, the one or more actions include scheduling the driver for a defensive driving course based on the distraction score and/or the policy compliance score. This may enable the driver to learn how to improve driving techniques and/or behavior, which may improve road safety, conserve fuel, conserve resources that would otherwise be wasted policing poor driving behavior and/or policy noncompliance, handling vehicle accidents, and/or the like.

In some implementations, the one or more actions may include the driver behavior system 115 causing vehicle 110 to be disabled based on the distraction score and/or the policy compliance score. In this way, the driver behavior system 115 may prevent vehicle 110 from being operated in a dangerous manner that risks death or injury (e.g., to the driver of vehicle 110, passengers of vehicle 110, other drivers, and/or the like), that risks damage to property (e.g., damage to vehicle 110, damage to other vehicles, damage to physical property, and/or the like), and/or the like. This may conserve resources that would otherwise be wasted in treating injuries, repairing damage, handling vehicle accidents, handling legal actions, and/or the like.

In some implementations, the one or more actions include annotating the video data with labels identifying the distracted behavior, to enable quick location of the distracted behavior. In some implementations, the one or more actions include retraining one or more of the first machine learning model, the second machine learning model, the third machine learning model, the fourth machine learning model, and/or the fifth machine learning model based on the distraction score and the policy compliance score. In this way, the driver behavior system 115 may improve the accuracy of the machine learning models, which may improve speed and efficiency of the machine learning models and conserve computing resources, network resources, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
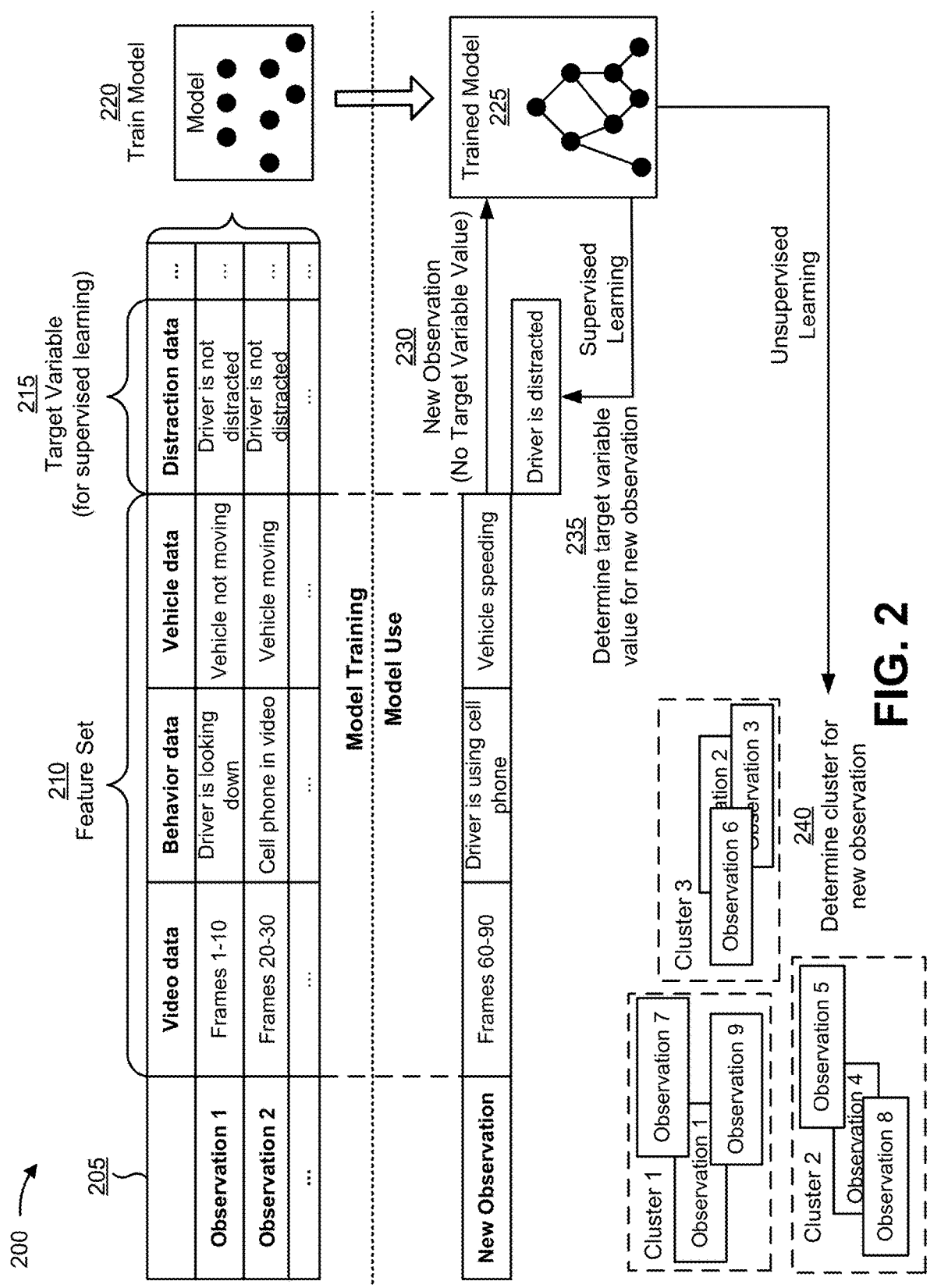
FIG. 2 is a diagram illustrating an example of training a machine learning model and applying a trained machine learning model to a new observation.

FIG. 2 is a diagram illustrating an example 200 of training and using a machine learning model in connection with identifying driver behavior from video. The machine learning model training and usage described herein may be performed using a machine learning system. The machine learning system may include or may be included in a computing device, a server, a cloud computing environment, and/or the like, such as driver behavior system 115 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from vehicle device 105, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from vehicle device 105. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of video data, a second feature of behavior data, a third feature of vehicle data, and so on. As shown, for a first observation, the first feature may have a value of frames 1-10, the second feature may have a value of driver is looking down, the third feature may have a value of vehicle not moving, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 200, the target variable is distraction data, which has a value of driver is not distracted for the first observation.

The feature set and target variable described above are provided as examples, and other examples may differ from what is described above. For example, for a target variable of distraction data, the feature set may include driver is not distracted.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of frames 60-90, a second feature of driver is using cell phone, a third feature of vehicle speeding, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of driver is distracted for the target variable of distraction data for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., driver is distracted), then the machine learning system may perform a first automated action and/or may cause a first automated action to be performed (e.g., by instructing another device to perform the automated action) based on classifying the new observation in the first cluster.

In some implementations, the automated action associated with the new observation may be based on a target variable value having a particular label (e.g., classification, categorization, and/or the like), may be based on whether a target variable value satisfies one or more threshold (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to identify driver behavior from video. The machine learning system enables recognition and/or identification of tens, hundreds, thousands, or millions of features and/or feature values for tens, hundreds, thousands, or millions of observations, thereby increasing accuracy and consistency and reducing delay associated with identifying driver behavior from video, relative to requiring computing resources to be allocated for tens, hundreds, or thousands of operators to manually identify driver behavior from video using the features or feature values. While some implementations described herein in relation to FIG. 2 are directed to determining whether driver behavior is distracted behavior (e.g., in association with the fourth machine learning model described in FIG. 1E), the description provided herein in relation to FIG. 2 applies to any machine learning model described herein (e.g., the first machine learning model, the second machine learning model, the third machine learning model, the fourth machine learning model, and/or the fifth machine learning model described herein in relation to FIGS. 1A-1H).

As indicated above, FIG. 2 is provided as an example. Other examples may differ from what is described in connection with FIG. 2.

Figure 3:
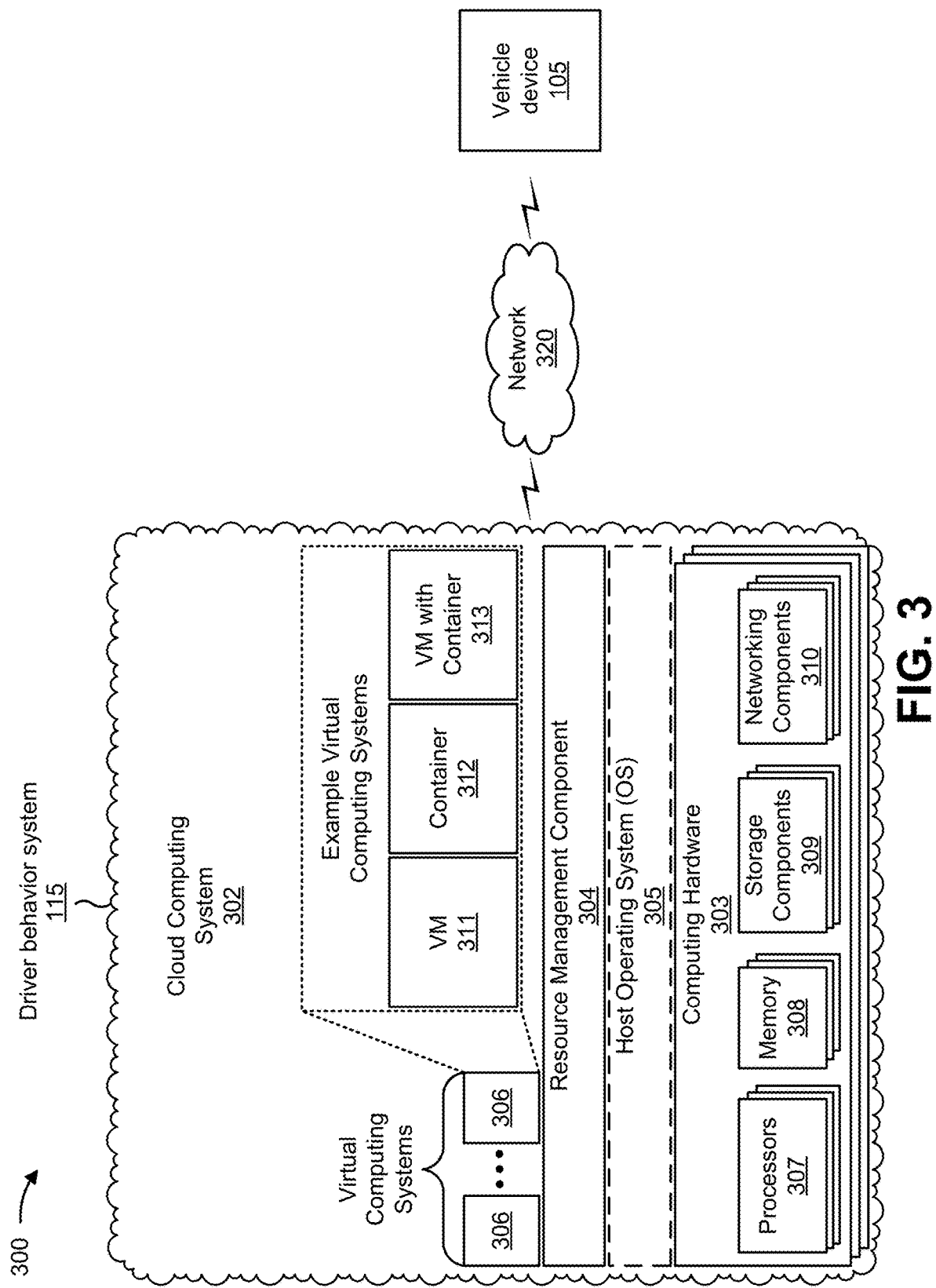
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a driver behavior system 115, which may include one or more elements of and/or may execute within a cloud computing system 302. The cloud computing system 302 may include one or more elements 303-313, as described in more detail below. As further shown in FIG. 3, environment 300 may include vehicle device 105 and/or a network 320. Devices and/or elements of environment 300 may interconnect via wired connections and/or wireless connections.

The vehicle device 105 may include one or more devices capable of receiving, generating, storing, processing, and/or providing information, such as information described herein. For example, vehicle device 105 may include a device included in vehicle 110 for obtaining data associated with the vehicle 110 traveling along a route such as an inertial measurement unit, a three-axis accelerometer, a gyroscope, a global positioning system (GPS) device, an OBD device, an ECU, a dash camera, a parking assist camera, a backup assist camera, and/or the like.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the driver behavior system 115 may include one or more elements 303-313 of the cloud computing system 302, may execute within the cloud computing system 302, and/or may be hosted within the cloud computing system 302, in some implementations, the driver behavior system 115 may not be cloud-based (e.g., may be implemented outside of a cloud computing system) or may be partially cloud-based. For example, the driver behavior system 115 may include one or more devices that are not part of the cloud computing system 302, such as device 400 of FIG. 4, which may include a standalone server or another type of computing device. The driver behavior system 115 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

Vehicle device 105 includes one or more devices capable of receiving, generating, storing, processing, and/or providing information, such as information described herein. For example, vehicle device 105 may include a mobile phone (e.g., a smart phone, a radiotelephone, etc.), a laptop computer, a tablet computer, a handheld computer, a device included in vehicle 110 (e.g., an inertial measurement unit, a three-axis accelerometer, a global positioning system (GPS) device, an OBD device, an ECU, a camera (e.g., a DFC), and/or the like) or a similar type of device. In some implementations, vehicle device 105 may receive information from and/or transmit information to driver behavior system 115.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
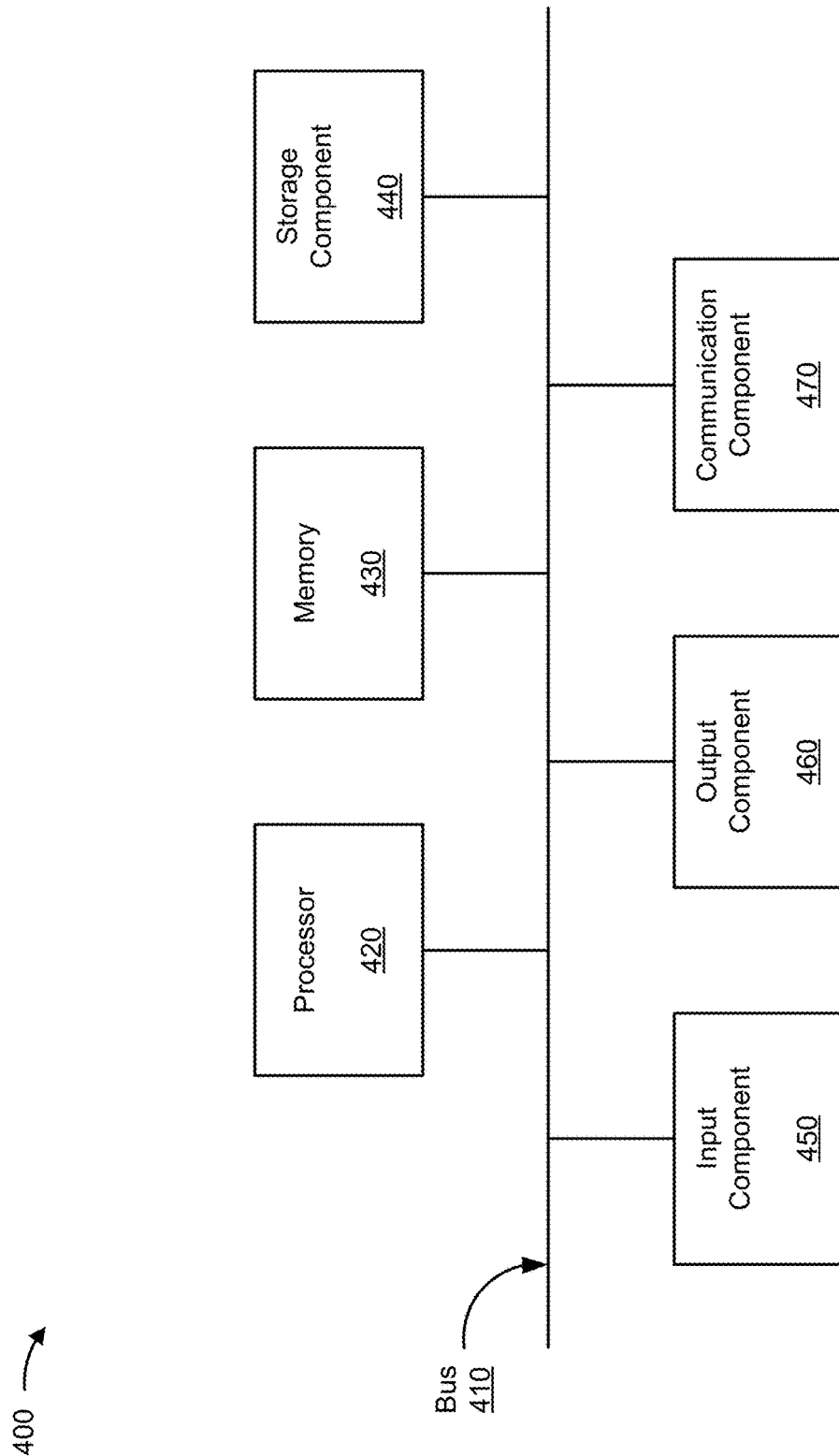
FIG. 4 is a diagram of example components of one or more devices of FIG. 2.

FIG. 4 is a diagram of example components of a device 400, which may correspond to vehicle device 105, driver behavior system 115, and/or computing hardware 303. In some implementations, vehicle device 105, driver behavior system 115, and/or computing hardware 303 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory), a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
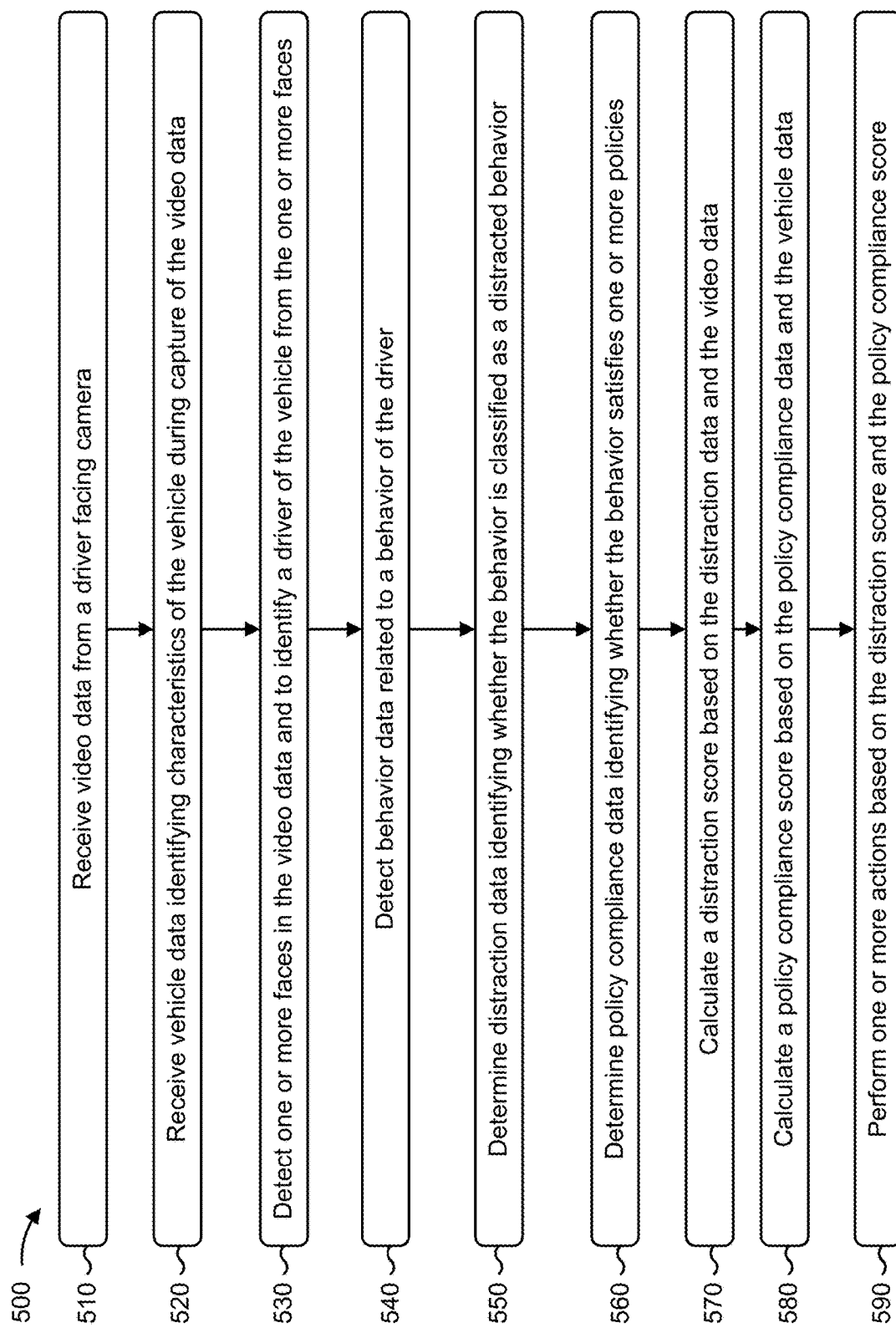
FIG. 5 is a flow chart of an example process relating to utilizing machine learning models to identify driver behavior from video.

FIG. 5 is a flow chart of an example process 500 associated with utilizing machine learning models to identify driver behavior from video. In some implementations, one or more process blocks of FIG. 5 may be performed by a device (e.g., driver behavior system 115). In some implementations, one or more process blocks of FIG. 5 may be performed by another device or a group of devices separate from or including the device, such as vehicle device 105, and/or the like. Additionally, or alternatively, one or more process blocks of FIG. 5 may be performed by one or more components of a device 400, such as processor 420, memory 430, storage component 440, input component 450, output component 460, communication interface 470, and/or the like.

As shown in FIG. 5, process 500 may include receiving video data from a driver facing camera (block 510). For example, the device may receive, from a driver facing camera of a vehicle, video data for video captured by the driver facing camera, as described above.

As further shown in FIG. 5, process 500 may include receiving vehicle data identifying characteristics of the vehicle during capture of the video data (block 520). For example, the device may receive vehicle data identifying characteristics of the vehicle during capture of the video data, as described above.

As further shown in FIG. 5, process 500 may include detecting one or more faces in the video data and to identify a driver of the vehicle from the one or more faces (block 530). For example, the device may process the video data, with a first machine learning model, to detect one or more faces in the video data and to identify a driver of the vehicle from the one or more faces, as described above.

As further shown in FIG. 5, process 500 may include detect behavior data related to a behavior of the driver (block 540). For example, the device may process the video data associated with the driver, with a second machine learning model, to detect behavior data identifying a behavior of the driver, as described above.

As further shown in FIG. 5, process 500 may include determining distraction data identifying whether the behavior is classified as a distracted behavior (block 550). For example, the device may process the behavior data, with a third machine learning model, to determine distraction data identifying whether the behavior is classified as a distracted behavior, as described above.

As further shown in FIG. 5, process 500 may include determining policy compliance data identifying whether the behavior satisfies one or more policies (block 560). For example, the device may process the behavior data, with a fourth machine learning model, to determine policy compliance data identifying whether the behavior satisfies one or more policies, as described above.

As further shown in FIG. 5, process 500 may include calculating a distraction score based on the distraction data and the video data (block 570). For example, the device may calculate a distraction score based on the distraction data and the video data, as described above.

As further shown in FIG. 5, process 500 may include calculating a policy compliance score based on the policy compliance data and the vehicle data (block 580). For example, the device may calculate a policy compliance score based on the policy compliance data and the vehicle data, as described above.

As further shown in FIG. 5, process 500 may include performing one or more actions based on the distraction score and the policy compliance score (block 590). For example, the device may perform one or more actions based on the distraction score and the policy compliance score, as described above.

Process 500 may include additional implementations, such as any single implementation or any combination of implementations described below and/or in connection with one or more other processes described elsewhere herein.

In a first implementation, process 500 includes processing the video data, with a fifth machine learning model, to verify an identity of the driver of the vehicle and identities of one or more passengers of the vehicle.

In a second implementation, alone or in combination with the first implementation, process 500 includes applying weights to the distraction score and the policy compliance score to generate a weighted distraction score and a weighted policy compliance score; and combining the weighted distraction score and the weighted policy compliance score to generate a driving behavior score for the driver of the vehicle.

In a third implementation, alone or in combination with one or more of the first and second implementations, processing the video data, with the first machine learning model, to detect the one or more faces in the video data and to identify the driver of the vehicle from the one or more faces comprises: determining that the one or more faces do not correspond to the driver, and generating and providing a notification indicating that the vehicle is not being operated by the driver.

In a fourth implementation, alone or in combination with one or more of the first through third implementations, processing the video data, with the first machine learning model, to detect the one or more faces in the video data and to identify the driver of the vehicle from the one or more faces comprises generating a bounding box for each detected face in each frame of the video data a frame of the video data; assigning weights to faces, of the one or more faces; calculating scores for the faces based on assigning weights to the faces, and identifying one of the faces as the driver based on the scores.

In a fifth implementation, alone or in combination with one or more of the first through fourth implementations, processing the video data associated with the driver, with the second machine learning model, to detect the behavior data identifying the behavior of the driver comprises determining a head pitch of the driver based on the video data, and selectively: determining that the driver is looking forward when the head pitch is approximately zero degrees; or determining that the driver is looking down when the head pitch is greater than approximately twenty degrees.

In a sixth implementation, alone or in combination with one or more of the first through fifth implementations, processing the video data associated with the driver, with the second machine learning model, to detect the behavior data identifying the behavior of the driver comprises determining a head pitch of the driver based on multiple frames of the video data; applying a filter to the multiple frames of the video data to determine whether the head pitch is uniform in a time interval; and selectively: determining that the driver is looking forward when the head pitch is uniform in the time interval and in a range from approximately zero degrees to approximately ten degrees; or determining that the driver is looking down when the head pitch is uniform in the time interval and greater than approximately twenty degrees.

In a seventh implementation, alone or in combination with one or more of the first through sixth implementations, process 700 includes determining a head pitch of the driver based on multiple frames of the video data; applying a filter to the multiple frames of the video data to determine whether the head pitch is uniform in a time interval; and selectively: determining that the driver is looking forward when the head pitch is uniform in the time interval and in a range from approximately zero degrees to approximately ten degrees; or determining that the driver is looking down when the head pitch is uniform in the time interval and greater than approximately twenty degrees.

In an eighth implementation, alone or in combination with one or more of the first through seventh implementations, processing the behavior data, with the third machine learning model, to determine the distraction data identifying whether the behavior is classified as a distracted behavior includes determining that the behavior is classified as a distracted behavior by determining that the driver is looking down; determining that the behavior is classified as a distracted behavior by determining that a user device present in the video data; determining that the behavior is classified as a distracted behavior by determining that the driver is utilizing a user device; determining that the behavior is classified as a distracted behavior by determining that the driver is yawning or blinking; or determining that the behavior is classified as a distracted behavior by determining that the driver is rubbernecking.

In a ninth implementation, alone or in combination with one or more of the first through eighth implementations, processing the behavior data, with the third machine learning model, to determine the distraction data identifying whether the behavior is classified as a distracted behavior includes detecting a plurality of facial points of the driver from the behavior data; determining a roll, a pitch, or a yaw of a head of the driver based on the plurality of facial points; and determining that the behavior is classified as a distracted behavior by determining that the driver is looking down based on the roll, the pitch, or the yaw of the head of the driver.

In a tenth implementation, alone or in combination with one or more of the first through ninth implementations, determining the distraction data identifying whether the behavior is classified as a distracted behavior includes utilizing an object detector that produces bounding boxes to detect a presence of an object from the behavior data; calculating a confidence level that the object is a user device; and determining that the behavior is classified as a distracted behavior by determining the presence of the user device when the confidence level satisfies a threshold level.

In an eleventh implementation, alone or in combination with one or more of the first through tenth implementations, processing the behavior data, with the third machine learning model, to determine the distraction data identifying whether the behavior is classified as a distracted behavior includes utilizing an activation map to detect utilization of a user device from the behavior data; calculating a confidence level that the user device is being utilized by the driver; and determining that the behavior is classified as a distracted behavior by determining that the driver is utilizing the user device when the confidence level satisfies a threshold level.

In a twelfth implementation, alone or in combination with one or more of the first through eleventh implementations, processing the behavior data, with the third machine learning model, to determine the distraction data identifying whether the behavior is classified as a distracted behavior includes cropping a plurality of images of a face of the driver based on the behavior data; determining whether eyes of the driver are opened or closed a first threshold quantity of times based on the cropped plurality of images; determining whether a mouth of the driver is opened a second threshold quantity of times based on the cropped plurality of images; determining that the behavior is classified as a distracted behavior by determining that the driver is blinking when the first quantity of times is satisfied; and determining that the behavior is classified as a distracted behavior by determining that the driver is yawning when the second quantity of times is satisfied.

In a thirteenth implementation, alone or in combination with one or more of the first through twelfth implementations, processing the behavior data, with the third machine learning model, to determine the distraction data identifying whether the behavior is classified as a distracted behavior includes detecting a plurality of facial points of the driver from the behavior data; determining a pitch of a head of the driver based on the plurality of facial points; and determining, based on the pitch of the head of the driver, that the distracted behavior is the driver rubbernecking.

In a fourteenth implementation, alone or in combination with one or more of the first through thirteenth implementations, the one or more policies include a policy associated with one or more of no smoking in the vehicle, wearing a seat belt in the vehicle, wearing a uniform in the vehicle, no drinking beverages in the vehicle, or no eating food in the vehicle.

In a fifteenth implementation, alone or in combination with one or more of the first through fourteenth implementations, calculating the distraction score and the policy compliance score based on the distraction data, the policy compliance data, and the vehicle data includes aggregating the distraction data and the vehicle data to calculate the distraction score; and aggregating the policy compliance data and the vehicle data to calculate the policy compliance score.

In a sixteenth implementation, alone or in combination with one or more of the first through fifteenth implementations, performing the one or more actions includes providing the distraction score and the policy compliance score for display; calculating and providing a driver behavior score based on the distraction score and the policy compliance score; or scheduling the driver for a defensive driving course based on the distraction score or the policy compliance score.

In a seventeenth implementation, alone or in combination with one or more of the first through sixteenth implementations, performing the one or more actions includes causing the vehicle to be disabled based on the distraction score or the policy compliance score; providing, to the vehicle, a warning for the driver based on the distraction score or the policy compliance score; annotating the video with labels identifying the distracted behavior to enable quick location of the behavior that lead to the distracted behavior; or retraining one or more of the first machine learning model, the second machine learning model, the third machine learning model, or the fourth machine learning model based on the distraction score and the policy compliance score.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used.

Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   receiving, by a device, video data from a driver facing camera of a vehicle;
   receiving, by the device, vehicle data identifying characteristics of the vehicle during capture of the video data;
   detecting, by the device, one or more faces in the video data and identifying a driver of the vehicle from the one or more faces;
   detecting, by the device, behavior data related to a behavior of the driver;
   determining, by the device, distraction data identifying whether the behavior is classified as a distracted behavior;
   determining, by the device, policy compliance data identifying whether the behavior satisfies one or more policies;
   calculating, by the device, a distraction score based on the distraction data and the video data;
   calculating, by the device, a policy compliance score based on the policy compliance data and the vehicle data; and
   performing, by the device, one or more actions based on the distraction score and the policy compliance score, wherein performing the one or more actions includes:
      applying, by the device, weights to the distraction score and the policy compliance score to generate a weighted distraction score and a weighted policy compliance score; and
      combining, by the device, the weighted distraction score and the weighted policy compliance score to generate a driving behavior score for the driver of the vehicle.

2. The method of claim 1, further comprising:
   verifying, based on the video data, an identity of the driver of the vehicle and identities of one or more passengers of the vehicle.

3. The method of claim 1, wherein determining the distraction data identifying whether the behavior is classified as the distracted behavior comprises:
   detecting a plurality of facial points of the driver from the behavior data;
   determining a roll, a pitch, or a yaw of a head of the driver based on the plurality of facial points; and
   determining that the behavior is classified as the distracted behavior by determining that the driver is looking down based on the roll, the pitch, or the yaw of the head of the driver.

4. The method of claim 1, wherein detecting the one or more faces in the video data and identifying the driver of the vehicle from the one or more faces comprises:
   determining, using a machine learning model, that the one or more faces do not correspond to the driver; and
   generating and providing a notification indicating that the vehicle is not being operated by the driver.

5. The method of claim 1, wherein detecting the one or more faces in the video data and identifying the driver of the vehicle from the one or more faces comprises:
generating a bounding box for each detected face, of the one or more faces, in each frame of the video data;
assigning weights to faces, of the one or more faces;
calculating scores for the faces based on assigning weights to the faces; and
identifying one of the faces as the driver based on the scores.

6. The method of claim 1, wherein detecting the behavior data related to the behavior of the driver comprises:
determining a head pitch of the driver based on the video data; and
selectively:
determining that the driver is looking forward when the head pitch is approximately zero degrees; or
determining that the driver is looking down when the head pitch is greater than approximately twenty degrees.

7. The method of claim 1, wherein detecting the behavior data related to the behavior of the driver comprises:
determining a head pitch of the driver based on multiple frames of the video data;
applying a filter to the multiple frames of the video data to determine whether the head pitch is uniform in a time interval; and
selectively:
determining that the driver is looking forward when the head pitch is uniform in the time interval and in a range from approximately zero degrees to approximately ten degrees; or
determining that the driver is looking down when the head pitch is uniform in the time interval and greater than approximately twenty degrees.

8. A device, comprising:
one or more processors configured to:
receive, from a driver facing camera of a vehicle, video data for video captured by the driver facing camera;
receive vehicle data identifying characteristics of the vehicle during capture of the video data;
process the video data, with a first machine learning model, to detect one or more faces in the video data and to identify a driver of the vehicle from the one or more faces;
process the video data associated with the driver, with a second machine learning model, to detect behavior data identifying a behavior of the driver;
process the behavior data, with a third machine learning model, to determine distraction data identifying whether the behavior is classified as a distracted behavior;
process the behavior data, with a fourth machine learning model, to determine policy compliance data identifying whether the behavior satisfies one or more policies;
calculate a distraction score based on the distraction data and the vehicle data;
calculate a policy compliance score based on the policy compliance data and the vehicle data; and
perform one or more actions based on the distraction score and the policy compliance score, wherein the one or more processors, to perform the one or more actions, are configured to:
apply weights to the distraction score and the policy compliance score to generate a weighted distraction score and a weighted policy compliance score; and
combine the weighted distraction score and the weighted policy compliance score to generate a driving behavior score for the driver of the vehicle.

9. The device of claim 8, wherein the one or more processors, to process the video data associated with the driver, with the second machine learning model, to detect the behavior data identifying the behavior of the driver, are configured to:
determine a head pitch of the driver based on multiple frames of the video data;
apply a filter to the multiple frames of the video data to determine whether the head pitch is uniform in a time interval; and
selectively:
determine that the driver is looking forward when the head pitch is uniform in the time interval and in a range from approximately zero degrees to approximately ten degrees; or
determine that the driver is looking down when the head pitch is uniform in the time interval and greater than approximately twenty degrees.

10. The device of claim 8, wherein the one or more processors, to process the behavior data, with the third machine learning model, to determine the distraction data identifying whether the behavior is classified as the distracted behavior, are configured to one or more of:
determine that the behavior is classified as the distracted behavior by determining that the driver is looking down;
determine that the behavior is classified as the distracted behavior by determining that a user device present in the video data;
determine that the behavior is classified as the distracted behavior by determining that the driver is utilizing the user device;
determine that the behavior is classified as the distracted behavior by determining that the driver is yawning or blinking; or
determine that the behavior is classified as the distracted behavior by determining that the driver is rubbernecking.

11. The device of claim 8, wherein the one or more processors, to process the behavior data, with the third machine learning model, to determine the distraction data identifying whether the behavior is classified as the distracted behavior, are configured to:
detect a plurality of facial points of the driver from the behavior data;
determine a roll, a pitch, or a yaw of a head of the driver based on the plurality of facial points; and
determine that the behavior is classified as the distracted behavior by determining that the driver is looking down based on the roll, the pitch, or the yaw of the head of the driver.

12. The device of claim 8, wherein the one or more processors, to process the behavior data, with the third machine learning model, to determine the distraction data identifying whether the behavior is classified as the distracted behavior, are configured to:
utilize an object detector that produces bounding boxes to detect a presence of an object from the behavior data;
calculate a confidence level that the object is a user device; and
determine that the behavior is classified as the distracted behavior by determining the presence of the user device when the confidence level satisfies a threshold level.

13. The device of claim 8, wherein the one or more processors, to process the behavior data, with the third machine learning model, to determine the distraction data identifying whether the behavior is classified as the distracted behavior, are configured to:
- utilize an activation map to detect utilization of a user device from the behavior data;
- calculate a confidence level that the user device is being utilized by the driver; and
- determine that the behavior is classified as the distracted behavior by determining that the driver is utilizing the user device when the confidence level satisfies a threshold level.

14. The device of claim 8, wherein the one or more processors, to process the behavior data, with the third machine learning model, to determine the distraction data identifying whether the behavior is classified as the distracted behavior, are configured to:
- crop a plurality of images of a face of the driver based on the behavior data;
- determine whether eyes of the driver are opened or closed a first threshold quantity of times based on the cropped plurality of images;
- determine whether a mouth of the driver is opened a second threshold quantity of times based on the cropped plurality of images; and
- determine that the behavior is classified as a distracted behavior by determining that the driver is blinking when the first threshold quantity of times is satisfied or by determining that the driver is yawning when the second threshold quantity of times is satisfied.

15. A non-transitory computer-readable medium storing instructions, the instructions comprising:
- one or more instructions that, when executed by one or more processors, cause the one or more processors to:
  - receive, from a driver facing camera of a vehicle, video data for video captured by the driver facing camera;
  - receive vehicle data identifying characteristics of the vehicle during capture of the video data;
  - process the video data, with a first machine learning model, to:
    - detect one or more faces in the video data,
    - generate a bounding box for each detected face in each frame of the video data,
    - assign weights to faces, of the one or more faces,
    - calculate scores for the faces based on assigning weights to the faces, and
    - identify one of the faces as a driver of the vehicle based on the scores;
  - process the video data associated with the driver, with a second machine learning model, to detect behavior data identifying a behavior of the driver;
  - process the behavior data, with a third machine learning model, to determine distraction data identifying that the behavior is classified as a distracted behavior by one or more of:
    - determining that the driver is looking down,
    - determining that a user device present in the video data,
    - determining that the driver is utilizing a user device;
    - determining that the driver is yawning or blinking; or
    - determining that the driver is rubbernecking;
  - process the behavior data, with a fourth machine learning model, to determine policy compliance data identifying whether the behavior satisfies one or more policies;
  - calculate a distraction score based on the distraction data and the vehicle data;
  - calculate a policy compliance score based on the policy compliance data and the vehicle data; and
  - perform one or more actions based on the distraction score and the policy compliance score, wherein the one or more instructions, that cause the one or more processors to perform the one or more actions, cause the one or more processors to:
    - apply weights to the distraction score and the policy compliance score to generate a weighted distraction score and a weighted policy compliance score; and
    - combine the weighted distraction score and the weighted policy compliance score to generate a driving behavior score for the driver of the vehicle.

16. The non-transitory computer-readable medium of claim 15, wherein the one or more instructions, that cause the one or more processors to process the behavior data, with the third machine learning model, to determine the distraction data identifying whether the behavior is classified as the distracted behavior, cause the one or more processors to:
- detect a plurality of facial points of the driver from the behavior data;
- determine a pitch of a head of the driver based on the plurality of facial points; and
- determine that the distracted behavior is the driver rubbernecking based on the pitch of the head of the driver.

17. The non-transitory computer-readable medium of claim 15, wherein the one or more policies include a policy associated with one or more of:
- no smoking in the vehicle,
- wearing a seat belt in the vehicle,
- wearing a uniform in the vehicle,
- no drinking beverages in the vehicle, or
- no eating food in the vehicle.

18. The non-transitory computer-readable medium of claim 15, wherein the one or more instructions, that cause the one or more processors to calculate the distraction score and the policy compliance score based on the distraction data, the policy compliance data, and the vehicle data, cause the one or more processors to:
- aggregate the distraction data and the vehicle data to calculate the distraction score; and
- aggregate the policy compliance data and the vehicle data to calculate the policy compliance score.

19. The non-transitory computer-readable medium of claim 15, wherein the one or more instructions, that cause the one or more processors to perform the one or more actions, cause the one or more processors to one or more of:
- provide the distraction score and the policy compliance score for display;
- provide the driving behavior score for display; or
- schedule the driver for a defensive driving course based on the distraction score or the policy compliance score.

20. The non-transitory computer-readable medium of claim 15, wherein the one or more instructions, that cause the one or more processors to perform the one or more actions, cause the one or more processors to one or more of:
- cause the vehicle to be disabled based on the distraction score or the policy compliance score;
- provide, to the vehicle, a warning for the driver based on the distraction score or the policy compliance score;
- annotate the video data with labels identifying the distracted behavior to enable quick location of the behavior that led to the distracted behavior; or retrain one or more of the first machine learning model, the second machine learning model, the third machine learning model, or the fourth machine learning model based on the distraction score and the policy compliance score.

\* \* \* \* \*